United States Patent [19]
Ojima

[11] Patent Number: 4,914,788
[45] Date of Patent: Apr. 10, 1990

[54] CLAMP STRUCTURE
[75] Inventor: Juji Ojima, Aikawa, Japan
[73] Assignee: NHK Spring Co., Ltd., Yokohama, Japan
[21] Appl. No.: 290,144
[22] Filed: Dec. 23, 1988
[30] Foreign Application Priority Data
 Dec. 28, 1987 [JP] Japan ................. 62-330095
 Mar. 18, 1988 [JP] Japan ................. 63-66526
[51] Int. Cl.$^4$ ............................. F16L 33/02
[52] U.S. Cl. .................... 24/20 R; 24/20 TT
[58] Field of Search ............ 24/20 R, 20 EE, 20 TT, 24/20 CW

[56] References Cited
U.S. PATENT DOCUMENTS

| 2,847,742 | 8/1958 | Oetiker . | |
| 3,266,109 | 8/1966 | Thomas | 24/20 TT |
| 3,402,436 | 9/1968 | Oetiker . | |
| 3,869,944 | 3/1975 | Oetiker . | |
| 3,981,049 | 9/1976 | Oetika . | |
| 4,222,155 | 9/1980 | Oetiker . | |
| 4,299,012 | 11/1981 | Oetiker . | |
| 4,430,775 | 2/1984 | Arthur . | |
| 4,517,708 | 5/1985 | Calmettes et al. . | |
| 4,523,352 | 6/1985 | Wachter | 24/20 CW X |
| 4,724,583 | 2/1988 | Ojima | 24/20 R |
| 4,802,261 | 2/1989 | Mizukoshi et al. | 24/20 TT |

FOREIGN PATENT DOCUMENTS
 365588 12/1962 Switzerland ................ 24/20 TT

Primary Examiner—James R. Brittain
Attorney, Agent, or Firm—Frishauf, Holtz, Goodman & Woodward

[57] ABSTRACT

A clamp includes a metal band body. The band body has separated both ends. The ring-shaped band body includes an outer lap portion, an inner lap portion, and an intermediate portion located between the inner and outer lap portions. A retaining hole is formed in the outer lap portion, and a hook is formed on the inner lap portion. The hook includes a sliding surface for allowing sliding of the outer lap portion when the outer and inner lap portions are relatively moved in a direction for reducing the diameter of the band body, and a hook edge hooked by an edge of the retaining hole against a force for increasing the diameter of the band body. A first projection is formed at the end of the outer lap portion to hook the distal end of a first arm of a crimping tool. A second projection is formed on the intermediate portion of the band body to hook the distal end of the second arm of the crimping tool. A distance between the first and second projections is shorter than that between the distal ends of the open arms of the crimping tool.

4 Claims, 7 Drawing Sheets

CLAMP STRUCTURE

BACKGROUND OF THE INVENTION

1. Field of the Invention

The present invention relates to a clamp structure used to fix a cylindrical member such as a pipe or a hose to another member.

2. Description of the Related Art

Various types of cylindrical members have been used in various types of machines and apparatuses, let alone vehicles, in a variety of applications. For example, an equal velocity joint used as a drive shaft of a vehicle is covered by a cylindrical boot to prevent dust and sand or water from entering or permeating into the joint and grease from leaking from it. A rubber boot is sometimes used in a suspension. Clamp structures are used to fix these boots.

An open type clamp is known as a conventional clamp, as disclosed in U.S. Pat. No. 3,981,049. This clamp comprises a metal band body, a hook formed at an intermediate portion of the band body along its longitudinal direction, a retaining hole for locking the hook, and a rack-like portion extending along the longitudinal direction of the band body. In order to fasten the band body to a surface to be fastened, teeth of a jig having a gear-like rotating portion are meshed with the rack-like portion, and the jig is rotated to reduce the outer diameter of the band body. According to this prior art, in addition to an exclusive tool for fastening the band body, the rack-like portion meshed with a gear-like rotary portion must be considerably long along the longitudinal direction of the band body, resulting in inconvenience.

In closed type clamps disclosed in U.S. Pat. Nos. 3,402,436 and 4,430,775, a lug extends on part of a ring-like band body. When the lug is crushed by a tool such as a nipper, the diameter of the band body is reduced so that the surface to be fastened is actually fastened. Since both ends of the closed type clamp are not separated from each other, it is sometimes difficult to be placed on a surface to be fastened. In addition, since a lug greatly extends on the outer surface of the band body, the lug tends to be brought into contact with an obstacle. When the lug strongly bumps against an obstacle, the lug may be deformed to loosen the band body.

SUMMARY OF THE INVENTION

It is, therefore, an object of the present invention to provide an open type clamp structure wherein a band body without a lug can be firmly fastened to a surface to be fastened, and the band body can be easily fastened and fixed with a simple crimping tool.

In order to achieve the above object of the present invention, there is provided a clamp structure comprising:

an elongated metal band body having separated both ends, the band body being formed in a ring-like or C shape so as to surround a surface to be fastened and being provided with outer and inner lap portions which overlap when the band body is mounted on the surface to be fastened, and an intermediate portion located between the inner and outer lap portions, the outer lap portion being provided with a longitudinal end having a first end face, and the inner lap portion being provided with a longitudinal end having a second end face;

at least one retaining hole formed in the outer lap portion, the outer lap portion being provided with a support wall in the retaining hole near the first end face;

at least one hook extending from an outer surface of the inner lap portion, the hook being provided with a sliding surface for allowing smooth sliding of the outer lap portion when the outer and inner lap portions are relatively moved in a direction for reducing a diameter of the band body and with a hook edge directed in a direction of the first end face and hooked on the support wall of the retaining hole against a force for increasing the diameter of the band body to fix the outer and inner lap portions;

a first crimping tool hook portion formed between the first end face of the outer lap portion and the retaining hole, the first crimping tool hook portion being directed in a direction opposite to that of the first end face, a distal end of a first arm of a crimping tool being hooked by the first crimping tool hook portion; and a second crimping tool hook portion formed in the intermediate portion of the band body, having a distance to the first crimping tool hook portion to be shorter than a distance between spread arms of the crimping tool, and directed in the same direction as that of the first end face, a second arm of the crimping tool being hooked by the second crimping tool hook portion.

In order to fix the clamp structure of the present invention on the surface to be fastened, the distal end portions of the arms of the crimping tool are hooked by first and second crimping tool hook portions formed in the band body, and the arms are moved to reduce the distance between the first and second crimping tool hook portions. By this operation, the inner surface of the outer lap portion is slid along the sliding surface of the hook, and the diameter of the band body is reduced. When the diameter of the band body reaches a predetermined value, the hook is fitted in a predetermined retaining hole, and the hook edge is hooked by the support wall of the retaining hole. Therefore, the band body is fixed to/the surface to be fastened.

DETAILED DESCRIPTION OF THE PREFERRED EMBODIMENTS

Figure 1:
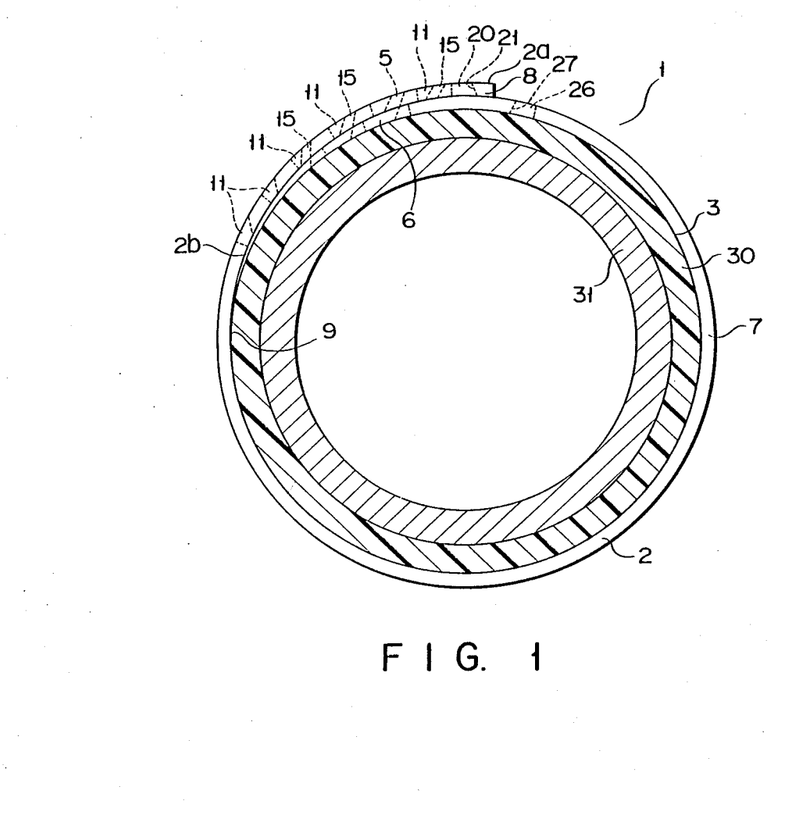
FIG. 1 is a front view of a clamp according to a first embodiment of the present invention.
Figure 2:
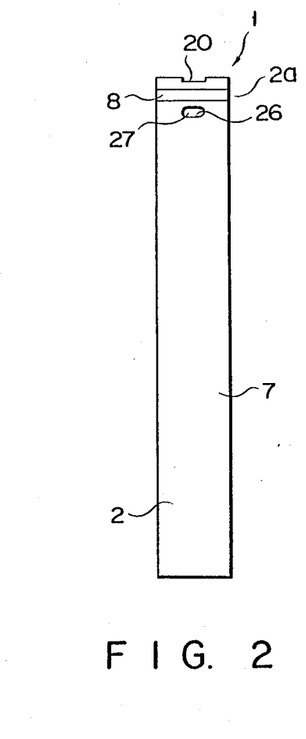
FIG. 2 is a side view of the clamp shown in FIG. 1.
Figure 3:
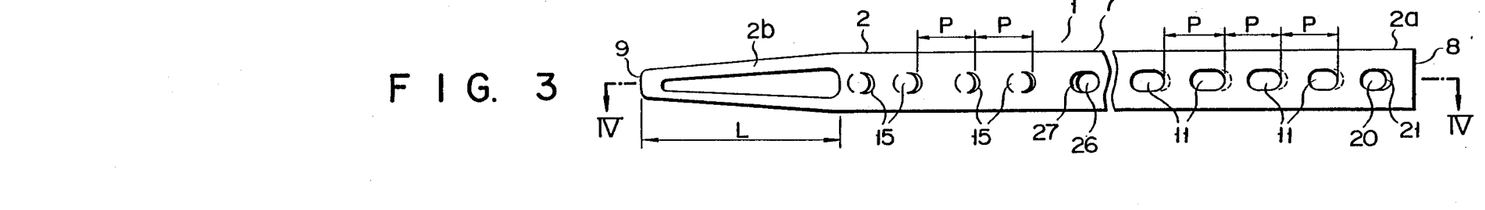
FIG. 3 is a bottom view showing a state wherein the clamp shown in FIG. 1 is developed.
Figure 4:
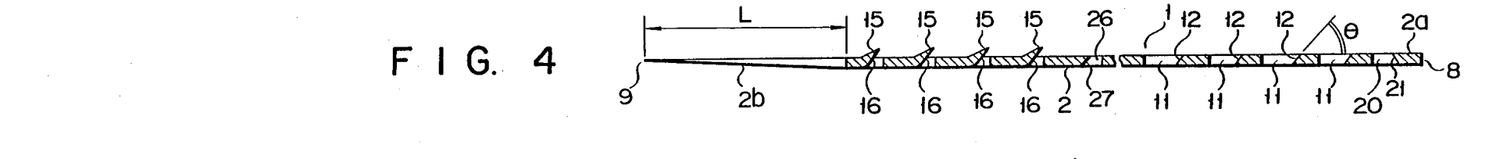
FIG. 4 is a sectional view of the clamp along the line IV—IV of FIG. 3.

FIG. 1 shows clamp 1 according to a first embodiment of the present invention. Band body 2 of this clamp 1 has a predetermined length in a developed state shown in FIG. 3. Since this clamp 1 is of an open type, band body 2 has separated both ends 2a and 2b. Band body 2 consists of a material having a proper spring property and flexibility like steel and more particularly stainless steel. A portion near one end 2b of band body 2 is tapered to reduce the width and thickness of the distal end portion by length L.

Figure 5:
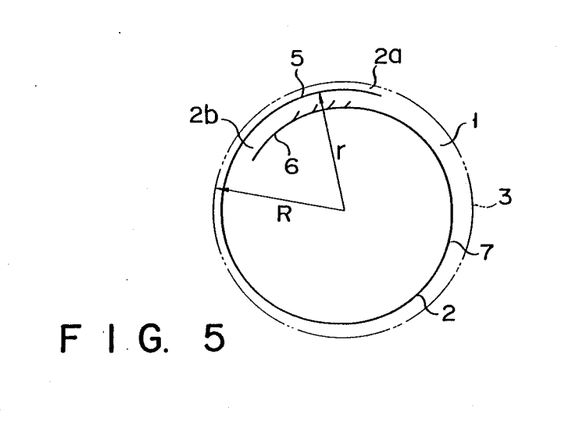
FIG. 5 is a front view showing a relationship between a diameter of the clamp shown in FIG. 1 and a diameter of a surface to be fastened.

Band body 2 is formed into a ring-like shape so as to be wound around surface 3 to be fastened. Ring-like body 2 comprises outer lap portion 5, inner lap portion 6, and intermediate portion 7 located between outer and inner lap portions 5 and 6. The longitudinal end of outer lap portion 5 has first end face 8, and an end of inner lap portion 6 has second end face 9. As shown in FIG. 5, radius r of outer lap portion 5 in a free state is smaller than radius R of surface 3.

A plurality of retaining holes 11 are formed in outer lap portion 5. These retaining holes 11 are formed at constant pitch P along the longitudinal direction of band body 2. A front surface side of each retaining hole 11, that is, support wall 12 located on the side of first end face 8 is inclined by angle $\theta$.

Figure 10:
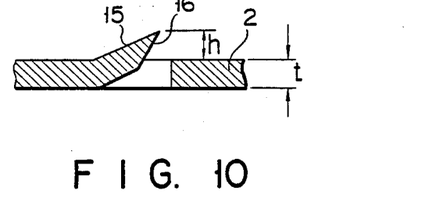

A plurality of hooks 15 are formed on inner lap portion 6. These hooks 15 are located at constant pitch P. Hook edge 16 which can be hooked by support wall 12 of each retaining hole 11 is inclined by about angle $\theta$. Sliding surface 15a along which an inner surface of outer lap portion 5 is slid is constituted by an upper surface of hook 15. Height h (FIG. 10) of hook 15 is equal to or smaller than thickness t of band body 2.

Figure 9:
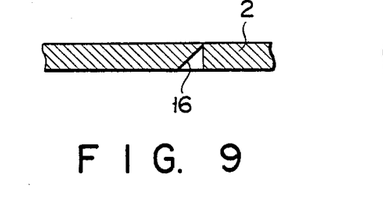
FIGS. 9 to 12 are sectional views showing a hook forming step.
Figure 11:
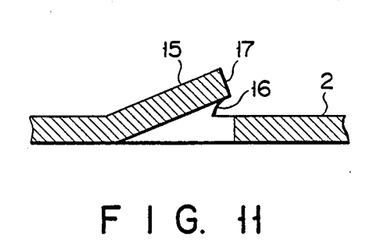
Figure 12:
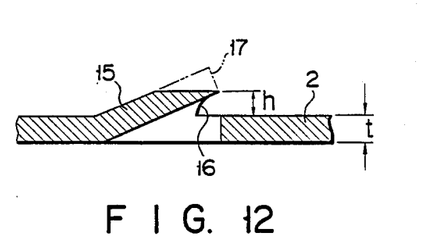

Each hook 15 extends outward by partially punching parts of band body 2 by pressing. As shown in FIG. 9, after a V-shaped recess is formed, the corresponding body portion is partially punched to form hook 15, thereby constituting inclined hook edge 16. Alternatively, after a body portion is partially punched to form hook 15 having a shape shown in FIG. 11, head portion 17 of hook 15 may be cut, as shown in FIG. 12.

One hole 20 is formed between first end face 8 and first retaining hole 11, and hook wall 21 serving as a crimping tool hook means is formed on the inner surface of hole 20. Hook wall 21 overhangs by angle $\alpha$ so as to easily hook the distal end of one arm 23 of crimping tool 22. A pair of arms 23 and 24 of crimping tool 22 can be opened or closed as in a normal nipper.

One hole 26 is formed in intermediate portion 7 of band body 2. Hook wall 27 serving as a second crimping tool hook means is formed on the inner surface of hole 26. Hook wall 27 overhangs by angle $\alpha$ so as to easily hook the distal end of arm 24 of crimping tool 22. Distance W (FIG. 7) between hook walls 21 and 27 is shorter than a distance between the distal ends of open arms 23 and 24.

Procedures for connecting boot 30 to pipe 31 (FIG. 1) by using clamp 1 will be described below. Boot 30 is made of rubber or a synthetic resin, and pipe 31 is made of a metal.

Figure 6:
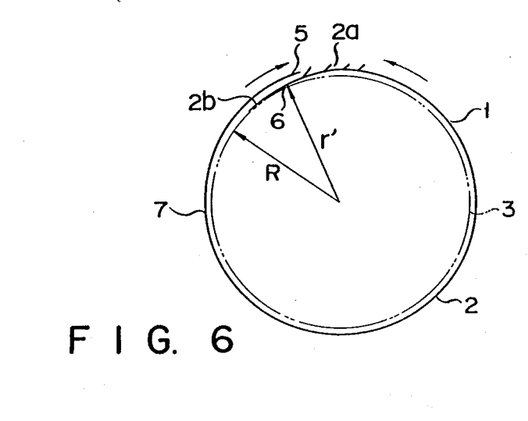
FIG. 6 is a front view showing a state wherein the clamp in FIG. 1 is placed on a surface to be fastened.

Band body 2 which is formed in a ring-like shape is spread and placed on surface 3 such that both ends 2a and 2b are separated. Band body 2 in a free state tends to restore the original ring-like shape by its elastic restoration force. For this reason, band body 2 is wound around surface 3, as shown in FIG. 6.

Figure 7:
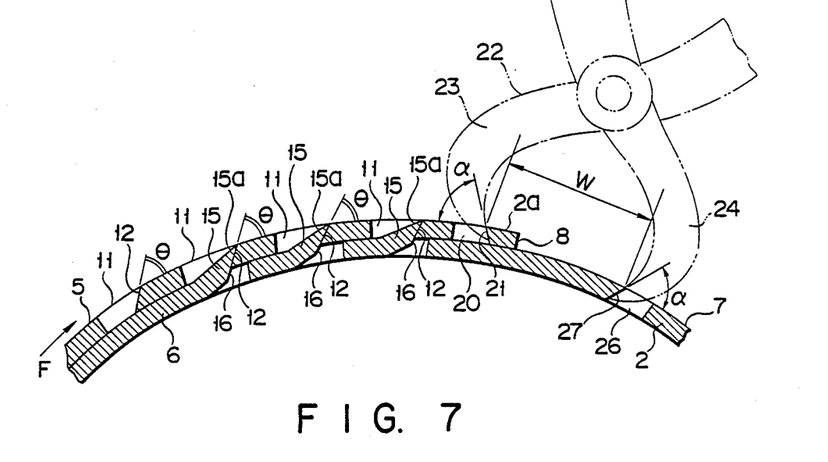
FIG. 7 is an enlarged sectional view showing a state before the clamp is fastened.
Figure 8:
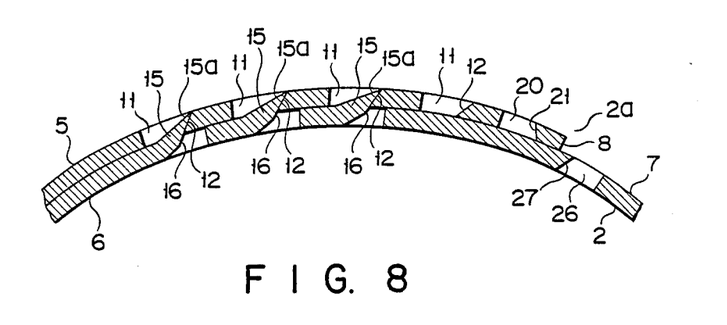
FIG. 8 is a sectional view showing a state wherein the clamp shown in FIG. 1 is fastened.

As shown in FIG. 7, the distal ends of arms 23 and 24 of crimping tool 22 are hooked by crimping tool hook walls 21 and 27, and arms 23 and 24 are moved to cause walls 21 and 27 to come close to each other. By this operation, outer lap portion 5 is relatively moved in a direction (i.e., a direction of arrow F in FIG. 7) for reducing the diameter of band body 2. That is, the inner surface of outer lap portion 5 is slid along sliding surface 15a of hook 15. When band body 2 is gradually fastened and the inner diameter of band body 2 reaches a predetermined value, hook 15 is inserted into predetermined retaining hole 11 and hook edge 16 is hooked by support wall 12 of predetermined hole 11. Since support wall 12 overhangs hook edge 16 by predetermined angle $\theta$, support wall 12 is firmly engaged with hook 15, and there is no fear of disengagement.

Boot 30 and pipe 31 are firmly fastened along the entire circumferences. Since the thickness of band body 2 near end 2b is reduced, no gap is formed between end face 9 and surface 3. For this reason, clamp 1 can be uniformly brought into tight contact with entire surface 3. In clamp 1 of this embodiment, band body 2 can be firmly fastened on surface 3 by using normal crimping tool 22 without forming a lug as in a conventional clamp.

At least one retaining hole 11 and at least one hook 15 are required to achieve the object of the present invention. When one hole 11 and one hook 15 are provided, the positions of hole 11 and hook 15 are determined in association with outer diameter R of surface 3 such that hook edge 16 is hooked by support wall 12 when a fastening amount of band body 2 reaches a predetermined value.

Figure 13:
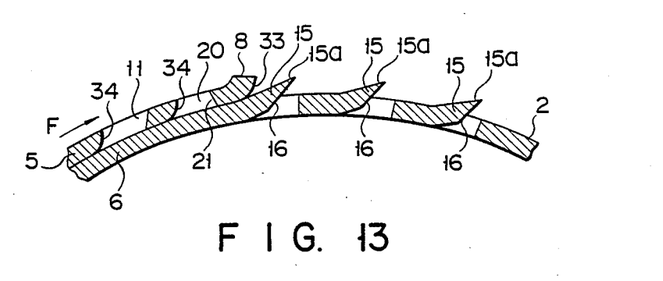
FIG. 13 is a sectional view showing a modification of a band body.
Figure 14:
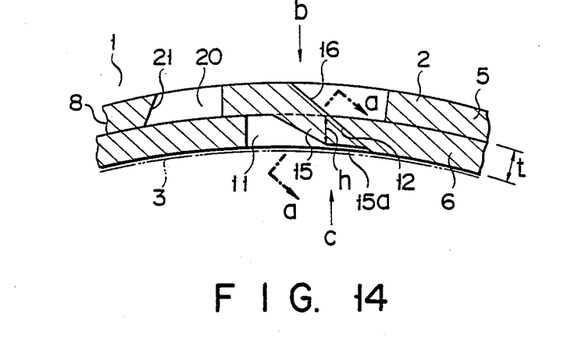
FIG. 14 is a partial sectional view of a clamp according to a second embodiment of the present invention.

A modification of band body 2 is shown in FIG. 13. In this modification, tapered or arcuated guide surfaces 33 and 34 are formed near end face 8 of band body 2 and at an edge of hole 11, respectively. By forming these guide surfaces 33 and 34, outer lap portion 5 can be easily slid along sliding surface 15a when band body 2 is moved for fastening in a direction of arrow F.

Figure 15:
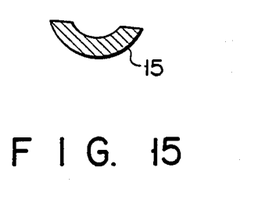
FIG. 15 is a sectional view of the clamp along the line a—a in FIG. 14.
Figure 16:
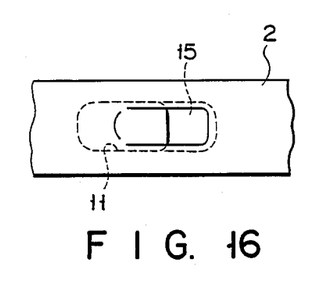
FIG. 16 is a plan view of the clamp when viewed from the b direction in FIG. 14.
Figure 17:
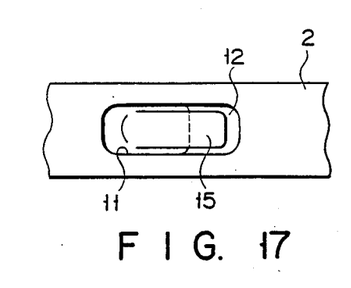
FIG. 17 is a bottom view of the clamp when viewed from the c direction in FIG. 14.
Figure 18:
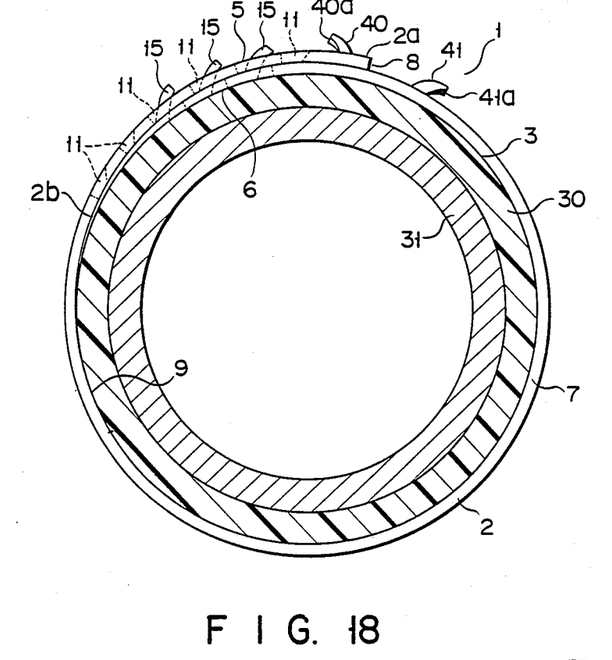
FIG. 18 is a front view of a clamp according to a third embodiment of the present invention.

In a second embodiment shown in FIGS. 14 to 17, hook 15 is directed toward the inner surface of band body 2. In this embodiment, hook 15 is formed on outer lap portion 5, and retaining hole 11 is formed in inner lap portion 6. Height h of hook 15 is less than thickness t of band body 2. In order to increase the strength of hook 15, the cross-sectional shape (section along the line a—a) of hook 15 is preferably an arcuated shape, as shown in FIG. 15.

A third embodiment is shown in FIGS. 18 to 22. As shown in the enlarged view of FIG. 20, distal end portion 36 of hook 15 can extend on the upper surface of outer lap portion 5. Therefore, hook edge 16 can be more firmly engaged with support wall 12. Hook 15 of this embodiment is formed such that its cross-sectional shape is an arcuated shape as in hook 15 of FIG. 15. In order to further increase the strength of hook 15, a pair of upright reinforcing walls 37 are formed at the right and left sides of hook 15. Hook edges 16 are formed on reinforcing walls 37, respectively. Sliding surface 15a along which outer lap portion 5 is slid is formed on the upper surface of hook 15.

In the third embodiment, projections 40 and 41 are employed as crimping tool hook means. First projection 40 is formed between retaining hole 11 and first end face 8 of band body 2. End face 40a of first projection 40 opposes hook 15. Second projection 41 is formed on intermediate portion 7 of band body 2. End face 41a of second projection 41 faces the same direction as hook 15, i.e., the same direction as that of first end face 8. Distance W (FIG. 19) between end face 40a of first projection 40 and end face 41a of second projection 41 is shorter than that between the distal ends of open arms 23 and 24.

The shape of projection 40 and 41 are the same as that of hook 15. That is, the cross sections of projections 40 and 41 have an arcuated shape. Upright reinforcing walls 42 and 43 are formed to increase the strength of projections 40 and 41.

Figure 19:
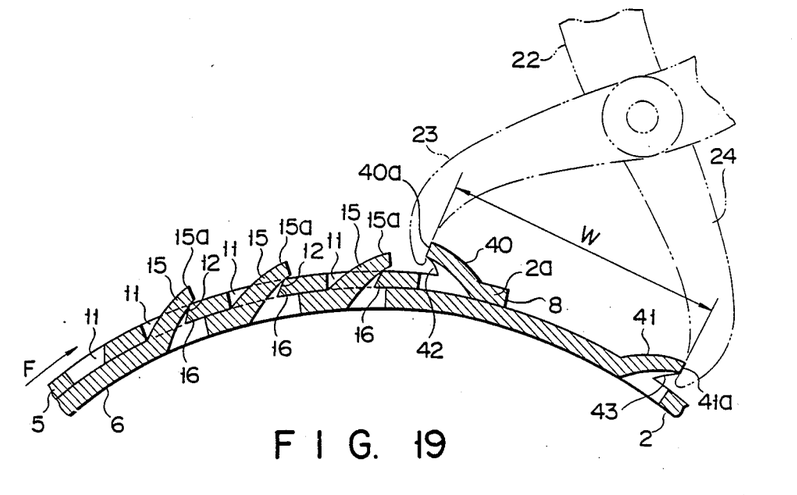
FIG. 19 is a sectional view showing a state before the clamp shown in FIG. 18 is fastened.
Figure 20:
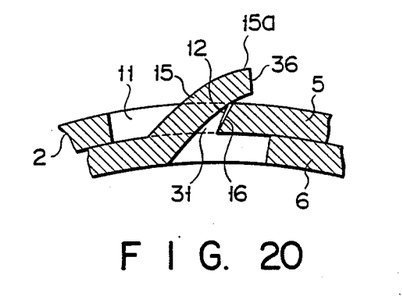
FIG. 20 is an enlarged sectional view showing a hook portion of the clamp shown in FIG. 18.
Figure 21:
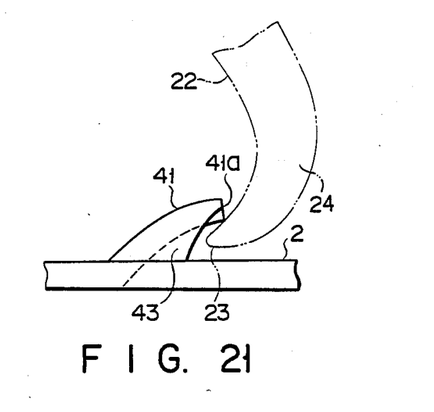
FIG. 21 is a side view showing a crimping tool hook portion of the clamp shown in FIG. 18.
Figure 22:
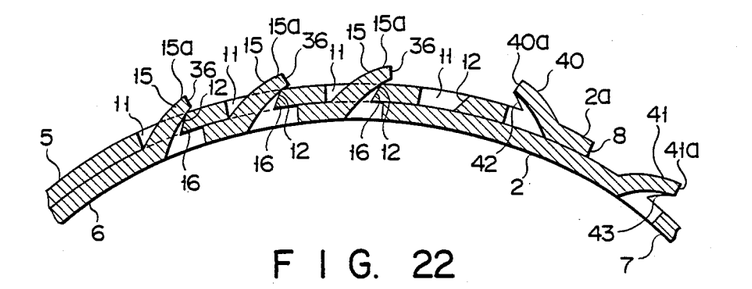
FIG. 22 is a sectional view showing a state wherein the clamp shown in FIG. 18 is fastened.

As shown in FIG. 19, after the distal ends of arms 23 and 24 of crimping tool 22 are hooked by end faces 40a and 41a of crimping tool hook projections 40 and 41, arms 23 and 24 are moved to cause end faces 40a and 41a to come close to each other. Outer lap portion 5 is relatively moved in a direction (i.e., a direction of arrow F in FIG. 19) for reducing the diameter of band body 2. That is, the inner surface of outer lap portion 5 is slid along sliding surface 15a of hook 15. When band body 2 is gradually fastened and the inner diameter of band body 2 reaches a predetermined value, hook 15 is inserted into predetermined retaining hole 11, and hook edge 16 is hooked by support wall 12 of predetermined retaining hole 11.

Figure 23:
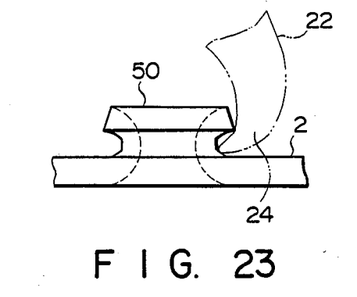
FIGS. 23 and 24 are side views showing modifications of the crimping tool hook portion, respectively.
Figure 24:
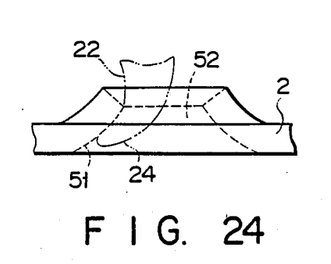

Projection 50 having a flange shown in FIG. 23 may be employed in place of projections 40 and 41. Alternatively, as shown in FIG. 24, hole 52 having crimping tool hook wall 51 may be employed. The shape of band body 2 prior to mounting of band body 2 on surface 3 may be a C shape.

What is claimed is:

1. A clamp structure mounted on a surface to be fastened by using a crimping tool having a pair of first and second openable arms, comprising:
    an elongated metal band body having a pair of ends which are separated when the clamp structure is in an unclamped state, said band body being formed in a ring-like or C shape so as to surround the surface to be fastened and being provided with outer and inner lap portions which overlap when said band body is mounted on the surface to be fastened, and an intermediate portion located between said inner and outer lap portions, said outer lap portion being provided with a longitudinal end having a first end face, and said inner lap portion being provided with a longitudinal end having a second end face;
    a plurality of retaining holes formed in said outer lap portion, said retaining holes having substantially the same shape and being arranged at a constant pitch along the longitudinal direction of said band body, said outer lap portion being provided with a support wall which is located in each of said retaining holes near said first end face;
    a plurality of hooks extending from an outer surface of said inner lap portion, said hooks have substantially the same shape and being arranged along the longitudinal direction of said band body at the same pitch as that of said retaining holes, each of said hooks having a sliding surface portion for allowing smooth sliding of said outer lap portion when said outer and inner lap portions are relatively moved in a direction for reducing a diameter of said band body, and each of said hooks having a pair of overhanging, right and left inclined hook edges directed in said longitudinal direction toward said first end face and hooked on said support wall of said retaining hole against a force for increasing the diameter of said band body to fix said outer and inner lap portions relative to each other, each of said hooks having a shape which bulges such that a cross sectional plane thereof has an arcuate outline;
    a first crimping tool-hooking projection formed between said first end face of said outer lap portion and one of said retaining holes, said first crimping tool-hooking projection having an overhanging shape and being curved such that a cross section thereof has an arcuate shape similar to that of said plurality of hooks, said first crimping tool-hooking projection being directed in said longitudinal direction away from said first end face, so that said first crimping tool-hooking projection can be hooked by a distal end portion of the first arm of said crimping tool; and
    a second crimping tool-hooking projection formed in said intermediate portion of said band body, said second crimping tool-hooking projection having an overhanging shape and being curved such that a cross section thereof has an arcuate shape similar to that of said plurality of hooks, said second crimping tool-hooking projection being spaced from said first crimping tool-hooking projection by a distance which is shorter than a distance between spread arms of the crimping tool, and being directed in said longitudinal direction toward said first end face, so that said second crimping tool-hooking projection can be hooked by a distal end portion of the second arm of said crimping tool.

2. A clamp structure according to claim 1, wherein said plurality of hooks are smaller in number than said retaining holes.

3. A clamp structure according to claim 1, wherein the end section of said inner lap portion is tapered to reduce the thickness thereof toward the distal end thereof.

4. A clamp structure according to claim 1, wherein the support walls of each of the retaining holes are respectively engageable with said plurality of hooks and are inclined in the same direction as said inclined hook edge.

* * * * *